(12) United States Patent
Deeman et al.

(10) Patent No.: US 7,218,465 B1
(45) Date of Patent: May 15, 2007

(54) MAGNETIC MEDIA PATTERNING VIA CONTACT PRINTING UTILIZING STAMPER HAVING MAGNETIC PATTERN FORMED IN NON-MAGNETIC SUBSTRATE

(75) Inventors: Neil Deeman, Fremont, CA (US); Shih-Fu Lee, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 360 days.

(21) Appl. No.: 10/453,508

(22) Filed: Jun. 4, 2003

Related U.S. Application Data

(60) Provisional application No. 60/392,986, filed on Jun. 28, 2002.

(51) Int. Cl.
*G11B 5/86* (2006.01)

(52) U.S. Cl. .................. 360/16; 360/17; 428/836; 428/692.1

(58) Field of Classification Search ............... 360/17; 428/836, 692; *G11B 5/86*
See application file for complete search history.

(56) References Cited

U.S. PATENT DOCUMENTS 5,353,169 A * 10/1994 Jeffers et al. ............... 360/16
6,804,070 B2 * 10/2004 Aoki et al. .................. 360/17
6,914,735 B2 * 7/2005 Hamada et al. ............. 360/17
2004/0038077 A1 * 2/2004 Nagao et al. ............. 428/692
2004/0218475 A1 * 11/2004 Nishikawa et al. ...... 369/13.02
2004/0257687 A1 * 12/2004 Ishida et al. ................ 360/17

FOREIGN PATENT DOCUMENTS

JP       57105827 A * 7/1982
JP    2001312819 A * 11/2001

* cited by examiner

*Primary Examiner*—Thang V. Tran
*Assistant Examiner*—Dan I Davidson
(74) *Attorney, Agent, or Firm*—McDermott Will & Emery LLP

(57) ABSTRACT

A stamper/imprinter for use in forming a magnetic transition pattern in a magnetic material by means of contact printing, comprising: (a) a non-magnetic substrate having a major surface comprising a patterned plurality of spaced-apart recesses with a plurality of non-recessed areas therebetween, the patterned plurality of recesses corresponding to the magnetic transition pattern to be formed in the magnetic material; and (b) unidirectionally permanently magnetized material filling each of the plurality of recesses and having exposed surfaces substantially coplanar with the plurality of non-recessed areas.

3 Claims, 5 Drawing Sheets

Patterned Medium

MAGNETIC MEDIA PATTERNING VIA CONTACT PRINTING UTILIZING STAMPER HAVING MAGNETIC PATTERN FORMED IN NON-MAGNETIC SUBSTRATE

CROSS-REFERENCE TO PROVISIONAL APPLICATION

This application claims priority from U.S. provisional patent application Ser. No. 60/392,986 filed Jun. 28, 2002, the entire disclosure of which is incorporated herein by reference.

FIELD OF THE INVENTION

The present invention relates to methods and devices for forming magnetic transition patterns in a layer or body of magnetic material. The invention has particular utility in the formation of servo patterns in the surfaces of magnetic recording layers of magnetic data/information storage and retrieval media, e.g., hard disks.

BACKGROUND OF THE INVENTION

Magnetic recording media are widely used in various applications, e.g., in hard disk form, particularly in the computer industry for storage and retrieval of large amounts of data/information in magnetizable form. Such media are conventionally fabricated in thin film form and are generally classified as "longitudinal" or "perpendicular", depending upon the orientation (i.e., parallel or perpendicular) of the magnetic domains of the grains of the magnetic material constituting the active magnetic recording layer, relative to the surface of the layer.

A portion of a conventional thin-film, longitudinal-type recording medium 1 utilized in disk form in computer-related applications is schematically depicted in FIG. 1 and comprises a non-magnetic substrate 10, typically of metal, e.g., an aluminum-magnesium (Al—Mg) alloy, having sequentially deposited thereon a plating layer 11, such as of amorphous nickel-phosphorus (NiP), a polycrystalline underlayer 12, typically of chromium (Cr) or a Cr-based alloy, a magnetic layer 13, e.g., of a cobalt (Co)-based alloy, a protective overcoat layer 14, typically containing carbon (C), e.g., diamond-like carbon ("DLC"), and a lubricant topcoat layer 15, typically of a perfluoropolyether compound applied by dipping, spraying, etc.

In operation of medium 1, the magnetic layer 13 is locally magnetized by a write transducer or write head (not shown in FIG. 1 for simplicity) to record and store data/information. The write transducer creates a highly concentrated magnetic field which alternates direction based on the bits of information being stored. When the local magnetic field applied by the write transducer is greater than the coercivity of the recording medium layer 13, then the grains of the polycrystalline medium at that location are magnetized. The grains retain their magnetization after the magnetic field applied by the write transducer is removed. The direction of the magnetization matches the direction of the applied magnetic field. The pattern of magnetization of the recording medium can subsequently produce an electrical response in a read transducer, allowing the stored medium to be read.

A typical recording system 20 utilizing a thin-film, vertically oriented, perpendicular-type magnetic medium 1' is illustrated in FIG. 2, wherein reference numerals 10, 11, 12A, 12B and 13', respectively, indicate the substrate, plating layer, soft magnetic underlayer, at least one non-magnetic interlayer, and vertically oriented, hard magnetic recording layer of perpendicular-type magnetic medium 1, and reference numerals 7 and 8, respectively, indicate the single and auxiliary poles of single-pole magnetic transducer head 6. Relatively thin interlayer 12B (also referred to as an "intermediate" layer), comprised of one or more layers of non-magnetic materials, serves to (1) prevent magnetic interaction between the soft underlayer 12A and the hard recording layer 13' and (2) promote desired microstructural and magnetic properties of the hard recording layer. As shown by the arrows in the figure indicating the path of the magnetic flux $\phi$, flux $\phi$ is seen as emanating from single pole 7 of single-pole magnetic transducer head 6, entering and passing through vertically oriented, hard magnetic recording layer 13' (which, as is known, may comprise a Co-based alloy, an iron oxide, or a multilayer magnetic superlattice structure) in the region above single pole 7, entering and travelling along soft magnetic underlayer 12A for a distance, and then exiting therefrom and passing through vertically oriented, hard magnetic recording layer 13' in the region above auxiliary pole 8 of single-pole magnetic transducer head 6. The direction of movement of perpendicular magnetic medium 1 past transducer head 6 is indicated in the figure by the arrow above medium 1.

With continued reference to FIG. 2, vertical lines 9 indicate grain boundaries of each polycrystalline (i.e., granular) layer of the layer stack constituting medium 1. As apparent from the figure, the width of the grains (as measured in a horizontal direction) of each of the polycrystalline layers constituting the layer stack of the medium is substantially the same, i.e., each overlying layer replicates the grain width of the underlying layer. Not shown in the figure, for illustrative simplicity, are a protective overcoat layer 14, such as of a diamond-like carbon (DLC) formed over hard magnetic layer 13', and a lubricant topcoat layer 15, such as of a perfluoropolyethylene material, formed over the protective overcoat layer. As with the longitudinal-type recording medium 1 shown in FIG. 1, substrate 10 is typically disk-shaped and comprised of a non-magnetic metal or alloy, e.g., Al or an Al-based alloy, such as Al—Mg having an Ni—P plating layer 11 on the deposition surface thereof, or substrate 10 is comprised of a suitable glass, ceramic, glass-ceramic, polymeric material, or a composite or laminate of these materials; soft underlayer 12A is typically comprised of an about 500 to about 4,000 Å thick layer of a soft magnetic material selected from the group consisting of Ni, NiFe (Permalloy), Co, CoZr, CoZrCr, CoZrNb, CoFe, Fe, FeN, FeSiAl, FeSiAlN, etc.; thin interlayer 12B typically comprises an up to about 100 Å thick layer of a non-magnetic material, such as TiCr; and hard magnetic layer 13' is typically comprised of an about 100 to about 250 Å thick layer of a Co-based alloy including one or more elements selected from the group consisting of Cr, Fe, Ta, Ni, Mo, Pt, V, Nb, Ge, and B, iron oxides, such as $Fe_3O_4$ and $\delta\text{-}Fe_2O_3$, or a $(CoX/Pd \text{ or } Pt)_n$ multilayer magnetic superlattice structure, where n is an integer from about 10 to about 25, each of the alternating, thin layers of Co-based magnetic alloy is from about 2 to about 3.5 Å thick, X is an element selected from the group consisting of Cr, Ta, B, Mo, and Pt, and each of the alternating thin, non-magnetic layers of Pd or Pt is about 1 Å thick. Each type of hard magnetic recording layer material has perpendicular anisotropy arising from magnetocrystalline anisotropy ($1^{st}$ type) and/or interfacial anisotropy ($2^{nd}$ type).

A typical contact start/stop (CSS) method employed during use of disk-shaped media involves a floating transducer head gliding at a predetermined distance from the surface of the disk due to dynamic pressure effects caused by air flow generated between mutually sliding surfaces of the transducer head and the disk. During reading and recording (writing) operations, the transducer head is maintained at a controlled distance from the recording surface, supported on a bearing of air as the disk rotates, such that the transducer head is freely movable in both the circumferential and radial directions, thereby allowing data to be recorded and retrieved from the disk at a desired position in a data zone.

Adverting to FIG. 3, shown therein, in simplified, schematic plan view, is a magnetic recording disk 30 (of either longitudinal or perpendicular type) having a data zone 34 including a plurality of servo tracks, and a contact start/stop (CSS) zone 32. A servo pattern 40 is formed within the data zone 34, and includes a number of data track zones 38 separated by servo tracking zones 36. The data storage function of disk 30 is confined to the data track zones 38, while servo tracking zones 36 provide information to the disk drive which allows a read/write head to maintain alignment on the individual, tightly-spaced data tracks.

Although only a relatively few of the servo tracking zones are shown in FIG. 3 for illustrative simplicity, it should be recognized that the track patterns of the media contemplated herein may include several hundreds of servo zones to improve head tracking during each rotation of the disk. In addition, the servo tracking zones need not be straight radial zones as shown in the figure, but may instead comprise arcs, intermittent zones, or irregularly-shaped zones separating individual data tracks.

In conventional hard disk drives, data is stored in terms of bits along the data tracks. In operation, the disk is rotated at a relatively high speed, and the magnetic head assembly is mounted on the end of a support or actuator arm, which radially positions the head on the disk surface. If the actuator arm is held stationary, the magnetic head assembly will pass over a circular path on the disk, i.e., over a data track, and information can be read from or written to that track. Each concentric track has a unique radius, and reading and writing information from or to a specific track requires the magnetic head to be located above that track. By moving the actuator arm, the magnetic head assembly is moved radially on the disk surface between tracks. Many actuator arms are rotatable, wherein the magnetic head assembly is moved between tracks by activating a servomotor which pivots the actuator arm about an axis of rotation. Alternatively, a linear actuator may be used to move a magnetic head assembly radially inwardly or outwardly along a straight line.

As has been stated above, to record information on the disk, the transducer creates and applies a highly concentrated magnetic field in close proximity to the magnetic recording medium. During writing, the strength of the concentrated magnetic field directly under the write transducer is greater than the coercivity of the recording medium, and grains of the recording medium at that location are magnetized in a direction which matches the direction of the applied magnetic field. The grains of the recording medium retain their magnetization after the magnetic field is removed. As the disk rotates, the direction of the writing magnetic field is alternated, based on bits of the information being stored, thereby recording a magnetic pattern on the track directly under the write transducer.

On each track, eight "bits" typically form one "byte" and bytes of data are grouped as sectors. Reading or writing a sector requires knowledge of the physical location of the data in the data zone so that the servo-controller of the disk drive can accurately position the read/write head in the correct location at the correct time. Most disk drives use disks with embedded "servo patterns" of magnetically readable information. The servo patterns are read by the magnetic head assembly to inform the disk drive of track location. In conventional disk drives, tracks typically include both data sectors and servo patterns and each servo pattern typically includes radial indexing information, as well as a "servo burst". A servo burst is a centering pattern to precisely position the head over the center of the track. Because of the locational precision needed, writing of servo patterns requires expensive servo-pattern writing equipment and is a time consuming process.

An approach for overcoming, or at least alleviating, the above problems associated with writing of magnetic patterns in a magnetic layer, e.g., servo patterns, is disclosed in commonly assigned U.S. Pat. No. 5,991,104 to Bonyhard, the entire disclosure of which is incorporated herein by reference. According to this approach, a method for forming a magnetic transition pattern, such as a servo pattern, in a layer of a magnetic material comprises steps of:

1) aligning a magnetic disk immediately adjacent a master servo-writer medium, the latter constituted of a magnetic layer having a greater magnetic coercivity than the former, wherein the servo-writer medium has a master servo pattern magnetically stored thereon which defines a plurality of concentric tracks;

2) applying a magnetic assist field to the aligned master servo-writer medium and magnetic disk, the magnetic assist field having a substantially equal magnitude at all tracks on the aligned master servo-writer medium and magnetic disk; and 3) rotating the aligned master servo-writer medium and magnetic disk relative to the magnetic assist field.

However, the above-described method incurs several drawbacks associated with its implementation in an industrially viable manner. Specifically, a "one-of-a-kind" master writer with a very high write field gradient is necessary for writing the requisite high intensity, master magnetic servo pattern onto the master disk, and a complicated means for rotating the aligned master servo-writer disk and "slave" workpiece magnetic disk is required, as is a complex system for controlling/regulating/rotating the intensity (i.e., magnitude) and directions of the magnetic assist field.

Commonly assigned, co-pending U.S. patent application Ser. No. 10/082,178, filed Feb. 26, 2002, the entire disclosure of which is incorporated herein by reference, discloses an improvement over the invention disclosed in the aforementioned commonly assigned U.S. Pat. No. 5,991,104, and is based upon the discovery that very sharply defined magnetic transition patterns can be reliably, rapidly, and cost-effectively formed in a magnetic medium containing a longitudinal or perpendicular type magnetic recording layer without requiring expensive, complicated fabrication of a master disk.

Specifically, the invention disclosed in co-pending, commonly assigned U.S. patent application Ser. No. 10/082,178 is based upon recognition that a stamper/imprinter (analogous to the aforementioned "master") comprised of a magnetic material having a high saturation magnetization, $B_{sat}$, i.e., $B_{sat} \geq$ about 0.5 Tesla, and a high permeability, $\mu$, i.e., $\mu \geq$ about 5, e.g., selected from Ni, NiFe, CoNiFe, CoSiFe, CoFe, and CoFeV, can be effectively utilized as a "master" contact mask (or "stamper/imprinter") for contact "imprinting" of a magnetic transition pattern, e.g., a servo pattern, in the surface of a magnetic recording layer of a magnetic medium ("slave"), whether of longitudinal or perpendicular type. A key feature of this invention is the use of a stamper/imprinter having an imprinting surface including a topographical pattern, i.e., comprised of projections and depressions, corresponding to a desired magnetic transition pattern, e.g., a servo pattern, to be formed in the magnetic recording layer. An advantage afforded by the invention is the ability to fabricate the topographically patterned imprinting surface of the stamper/imprinter, as well as the substrate or body therefor, of a single material, as by use of well-known and economical electro-forming techniques.

According to this invention, the magnetic domains of the magnetic recording layer of the slave medium are first unidirectionally aligned (i.e., "erased" or "initialized"), as by application of a first external, unidirectional magnetic field $H_{initial}$ of first direction and high strength greater than the saturation field of the magnetic recording layer, typically $\geq 2,000$ and up to about 20,000 Oe. The imprinting surface of the stamper/imprinter (master) is then brought into intimate (i.e., touching) contact with the surface of the magnetic recording layer (slave). With the assistance of a second externally applied magnetic field of second, opposite direction and lower but appropriate strength $H_{re-align}$, determined by $B_{sat}/\mu$ of the stamper material (typically $\geq 100$ Oe, e.g., from about 2,000 to about 4,500 Oe), the alignment of the magnetic domains at the areas of contact between the projections of the imprinting surface of the stamper/imprinter or at the areas facing the depressions of the imprinting surface of the stamper/imprinter and the magnetic recording layer of the medium to be patterned (slave) is selectively reversed, while the alignment of the magnetic domains at the non-contacting areas (defined by the depressions in the imprinting surface of the stamper/imprinter) or at the contacting areas, respectively, is unaffected, whereby a sharply defined magnetic transition pattern is created within the magnetic recording layer of the medium to be patterned (slave) which essentially mimics the topographical pattern of projections and depressions of the imprinting surface (master). According to the invention, high $B_{sat}$ and high $\mu$ materials are preferred for use as the stamper/imprinter in order to: (1) avoid early magnetic saturation of the stamper/imprinter at the contact points between the projections of the imprinting surface and the magnetic recording layer, and (2) provide an easy path for the magnetic flux lines which enter and/or exit at the side edges of the projections.

Stampers/imprinters for use in a typical application according to the disclosed invention, e.g., servo pattern formation in the recording layer of a disk-shaped, thin film, longitudinal or perpendicular magnetic recording medium, are formed according to conventional techniques, and typically comprise an imprinting surface having topographical features consisting of larger area data zones separated by smaller areas with well-defined patterns of projections and depressions corresponding to conventionally configured servo sectors, as for example, disclosed in the aforementioned commonly assigned U.S. Pat. No. 5,991,104. For example, a suitable topography for forming the servo sectors may comprise a plurality of projections having a height in the range from about 20 to about 500 nm, a width in the range from about 0.01 to about 1 µm, and a spacing of at least about 0.01 µm. Stampers/imprinters comprising imprinting surfaces with suitable surface topographies may be readily formed by a variety of techniques, such as electroforming onto a planar-surfaced substrate through an apertured, non-conductive mask, or by pattern formation in a planar-surfaced substrate by means photolithographic wet (i.e., chemical) or dry (e.g., plasma, sputter, or ion beam) etching techniques.

FIG. 4 illustrates a sequence of steps for performing magnetic transition patterning by contact printing of a perpendicular recording medium, e.g., medium 1' depicted in FIG. 2 and comprised of a non-magnetic substrate 10 and an overlying thin layer 13' of a perpendicular-type magnetic recording material (where plating layer 11, soft magnetic underlayer 12A, and non-magnetic interlayer 12B are omitted from FIG. 4 in order to not unnecessarily obscure the essential features/aspects of the present invention) is subjected to a DC erase or magnetic initialization process for unidirectionally aligning the perpendicularly oriented magnetic domains $13_\perp$ of magnetic recording layer 13'. Magnetic initialization of perpendicular medium 1' is accomplished by applying a first, high strength, unidirectional DC magnetic initialization field $H_{initial}$ normal to the opposed major surfaces thereof, i.e., normal to the lower surface of substrate 10 and upper surface of magnetic recording layer 13', wherein $H_{initial} \geq$ coercivity of layer 13' and is typically in the range from above about 2,000 to about 20,000 Oe.

According to the next step of the process sequence, a stamper/imprinter 16 composed of composed of a body of magnetic material having a high saturation magnetization, $B_{sat}$, i.e., $B_{sat} \geq$ about 0.5 Tesla, and a high permeability, $\mu$, i.e., $\mu \geq$ about 5, e.g., selected from Ni, NiFe, CoNiFe, CoSiFe, CoFe, and CoFeV, and having an imprinting surface 17 having a topography comprised of a plurality of projections 18 and depressions 19 arranged in a pattern corresponding to a magnetic transition pattern to be formed in the surface of magnetic recording layer 13', e.g., a plurality of data zones separated by servo sectors, is placed in intimate (i.e., touching) contact with the surface of layer 13'. By way of illustration only, a suitable topography for the imprinting surface 17 of a contact mask-type stamper/imprinter 16 for use in forming a recording medium with data zones separated by servo sectors according to the invention may comprise a plurality of projections 18 having a height in the range from about 20 to about 500 nm, a width in the range from about 0.01 to about 1 µm, and a spacing (defining the depressions 19) of at least about 0.01 µm). A second, unidirectional DC magnetic re-alignment field $H_{re-align}$ of direction reverse that of the DC magnetic initialization field $H_{initial}$ is then applied normal to the upper surface of stamper/imprinter 16 and the lower surface of substrate 10 of medium 1', the strength of $H_{re-align}$ being lower than that of $H_{initial}$ and optimized at a value determined by $B_{sat}/\mu$ of the stamper material (typically $\geq 100$ Oe, e.g., from about 2,000 to about 4,500 Oe for the above-listed high $B_{sat}$, high $\mu$ materials). According to the invention, due to the high permeability $\mu$ of the stamper material, the magnetic flux $\phi$ provided by the re-alignment field $H_{re-align}$ tends to concentrate at the projections 18 of the stamper/imprinter 16, which projections are in touching contact with the surface of magnetic recording layer 13'. As a consequence, the surface areas of magnetic recording layer 13' immediately beneath the projections 18 experience a significantly higher magnetic field than the surface areas at the non-contacting areas facing the depressions 19. If the re-alignment field strength $H_{re-align}$ is optimized (e.g., as described supra), the direction of magnetization (i.e., alignment) of the perpendicularly oriented magnetic domains $13_\perp$ is selectively reversed (as indicated by the arrows in the figure) at the areas of the magnetic recording layer 13' where the projections 18 of the imprinting surface 17 of the stamper/imprinter 16 contact the surface of the magnetic recording layer 13', and the magnetic alignment of the perpendicularly oriented magnetic domains $13_\perp$ facing the depressions 19 in the imprinting surface 17 is retained. Consequently, upon removal of the stamper/imprinter 16 and the re-alignment field $H_{re\text{-}align}$ in the next (i.e., final) step according to the inventive methodology, a perpendicular recording medium 1' is formed with a magnetic transition pattern comprising a plurality of data zones separated by servo sectors each comprising a plurality of reversely oriented perpendicular magnetic domains $13_{\perp R}$ corresponding to the desired servo pattern.

FIG. 5 illustrates a similar sequence of steps for performing magnetic transition patterning by contact printing of a longitudinal recording medium, e.g., medium 1 depicted in FIG. 1 and comprised of a non-magnetic substrate 10 and an overlying thin layer 13 of a longitudinal-type magnetic layer (where plating layer 11, polycrystalline underlayer 12, protective overcoat layer 14, and lubricant topcoat layer 15 are omitted from FIG. 5 in order not to unnecessarily obscure the essential features/aspects of the present invention) is initially subjected to a magnetic erase (or "initialization") process for unidirectionally aligning the longitudinally oriented magnetic domains $13_=$ of magnetic recording layer 13. Magnetic initialization of longitudinal medium 1 is accomplished by applying a first, high strength, unidirectional magnetic field $H_{initial}$ parallel to the surface of the magnetic recording layer, such that $H_{initial} \div$ coercivity of layer 13' and is typically in the range from about 2,000 to about 20,000 Oe. In this instance, $H_{initial}$ is applied perpendicularly (i.e., normal) to the side edges of medium 1, whereas, by contrast, $H_{initial}$ for a perpendicular medium would be applied normal to the upper and lower major surfaces of the medium.

According to the next step of the process sequence, a stamper/imprinter 16 comprised of a body of magnetic material having a high saturation magnetization, $B_{sat}$, i.e., $B_{sat} \div$ about 0.5 Tesla, and a high permeability, $\mu$, i.e., $\mu \geq$ about 5, e.g., selected from Ni, NiFe, CoNiFe, CoSiFe, CoFe, and CoFeV, and having an imprinting surface 17 having a topography comprised of a plurality of projections 18 and depressions 19 arranged in a pattern corresponding to a magnetic transition pattern to be formed in the surface of magnetic recording layer 13, e.g., a plurality of data zones separated by servo sectors, is placed in intimate (i.e., touching) contact with the surface of layer 13. By way of illustration only, a suitable topography for the imprinting surface 17 of a contact mask-type stamper/imprinter 16 for use in forming a recording medium with data zones separated by servo sectors in longitudinal recording layer 13 according to the invention may comprise a plurality of projections 18 having a height in the range from about 20 to about 500 nm, a width of at least about 0.01 µm, and a spacing (defining the depressions 19) in the range from about 0.01 to about 1 µm. A second, unidirectional magnetic re-alignment field $H_{re\text{-}align}$ parallel to the major surface of magnetic recording layer 13 but of lower strength and direction reverse that of the magnetic initialization field $H_{initial}$ is then applied normal to the side edge surfaces of stamper/imprinter 16, the strength of $H_{re\text{-}align}$ being optimized at a value determined by $B_{sat}/\mu$ of the stamper material (typically $\geq$ 100 Oe, e.g., from about 2,000 to about 4,500 Oe for the above-listed high $B_{sat}$, high µ materials) According to the invention, due to the high permeability µ of the stamper material, the magnetic flux φ provided by the re-alignment field $H_{re\text{-}align}$ enters and exits the side edges of the projections and tends to concentrate at the depressions 19 of the stamper/imprinter 16 (rather than at the projections 18). As a consequence, the non-contacted surface areas of magnetic recording layer 13 immediately beneath the depressions 19 experience a significantly higher magnetic field than the surface areas of the magnetic recording layer 13 in contact with the projections 18. If the re-alignment field strength $H_{re\text{-}align}$ is optimized, the direction of magnetization (i.e., alignment) of the longitudinally oriented magnetic domains $13_=$ of the magnetic recording layer 13 will be selectively reversed (as indicated by the arrows in the figure) at the areas facing the depressions 19 of the imprinting surface 17 of the stamper/imprinter 16, whereas the alignment of the longitudinally oriented magnetic domains $13_=$ of the magnetic recording layer 13 in contact with the projections 18 of the imprinting surface 17 of the stamper/imprinter 16 will be retained. Consequently, upon removal of the stamper/imprinter 16 and the re-alignment field $H_{re\text{-}align}$ in the next (i.e., final) step according to the inventive methodology, a longitudinal recording medium 1 is formed with a magnetic transition pattern comprising a plurality of data zones separated by servo sectors each comprising of a plurality of reversely longitudinally oriented magnetic domains $13_{=R}$ corresponding to the desired servo pattern.

In practice, however, the design and manufacture of stampers/imprinters for performing servo patterning of magnetic recording media by means of contact printing, as described supra, incur problems associated with defect control and the requirement for application of an external magnetic field during the printing process for effecting selective re-alignment of the magnetic domains to yield the desired magnetic transition pattern.

Accordingly, there exists a need for means and methodology for performing servo patterning by contact printing which are free of the above-described drawbacks and disadvantages associated with the use of conventionally-configured/structured stampers/imprinters, and facilitate high quality replication of servo patterns in magnetic recording media via contact printing. Moreover, there exists a need for methodology and instrumentalities, e.g., improved stampers/imprinters for performing rapid, cost-effective servo patterning of thin film, high areal recording density magnetic recording media which do not engender the above-stated concerns and disadvantages associated with existing methodologies/instrumentalities for patterning magnetic recording media by contact printing.

The present invention addresses and solves the above-described problems, disadvantages, and drawbacks associated with prior methodologies for servo pattern formation in thin film magnetic recording media, while maintaining full compatibility with the requirements of automated hard disk manufacturing technology.

DISCLOSURE OF THE INVENTION

An advantage of the present invention is an improved method of manufacturing a stamper/imprinter for use in forming a magnetic transition pattern in a magnetic material by means of contact printing.

Another advantage of the present invention is an improved method of manufacturing a stamper/imprinter for use in forming a servo pattern in a magnetic recording medium by means of contact printing.

A further advantage of the present invention is an improved stamper/imprinter for performing contact printing of a magnetic transition pattern in a magnetic material.

A still further advantage of the present invention is an improved stamper/imprinter for performing contact printing of servo patterns in longitudinal or perpendicular magnetic recording media.

Yet another advantage of the present invention is an improved method for performing contact printing of a magnetic transition pattern in a magnetic medium.

Still another advantage of the present invention is an improved method for performing contact printing of servo patterns in longitudinal or perpendicular magnetic recording media.

Additional advantages and other features of the present invention will be set forth in the description which follows and in part will become apparent to those having ordinary skill in the art upon examination of the following or may be learned from the practice of the present invention. The advantages of the present invention may be realized as particularly pointed out in the appended claims.

According to one aspect of the present invention, the foregoing and other advantages are obtained in part by a method of manufacturing a stamper/imprinter for use in forming a magnetic transition pattern in a magnetic material by means of contact printing, comprising sequential steps of:

(a) providing a non-magnetic substrate having a major surface comprising a patterned plurality of spaced-apart recesses with a plurality of non-recessed areas therebetween, the patterned plurality of recesses corresponding to said magnetic transition pattern to be formed in the magnetic material;

(b) forming a blanket layer of a permanently magnetizable material on the substrate surface, the blanket layer overfilling the plurality of recesses and covering the non-recessed areas;

(c) removing portions of the blanket layer covering the plurality of non-recessed areas of the substrate surface and rendering exposed upper portions of the blanket layer filling the plurality of recesses substantially coplanar with the plurality of non-recessed areas; and (d) unidirectionally permanently magnetizing the permanently magnetizable material filling the plurality of recesses.

According to embodiments of the present invention, step (a) comprises sequential antecedent steps of:

($a_1$) providing a non-magnetic substrate having a flat planar major surface;

($a_2$) forming a layer of a resist material on the substrate surface;

($a_3$) patterning the resist layer to form a patterned resist layer comprising a patterned plurality of openings therein exposing selected portions of the substrate surface, the patterned plurality of openings corresponding to the magnetic transition pattern to be formed in the magnetic material;

($a_4$) selectively forming a patterned plurality of recesses in the substrate surface utilizing the patterned resist layer as a mask, the patterned plurality of recesses corresponding to the magnetic transition pattern to be formed in the magnetic material; and ($a_5$) removing the resist layer.

In accordance with embodiments of the present invention, step (a) comprises providing a non-magnetic substrate consisting essentially of a non-magnetic material selected from the group consisting of: metals, metal alloys, semiconductors, ceramics, glass, glass-ceramics, polymers, and composites or laminates of the aforementioned materials.

According to preferred embodiments of the invention, step (a) comprises providing a non-magnetic substrate having a major surface comprising a plurality of spaced-apart recesses corresponding to a servo pattern to be formed in the magnetic material; step (b) comprises forming a blanket layer of a permanently magnetizable material selected from the group consisting of: FeOBa, FeOSr, SmCo, NdFeB, CoCr, CoCrB, and AlNiCo; step (c) comprises planarizing the blanket layer of permanently magnetizable material by means of chemical-mechanical polishing (CMP); and step (d) comprises applying a unidirectionally aligned external magnetic field to the substrate to unidirectionally permanently magnetize the permanently magnetizable material filling the plurality of recesses According to alternative embodiments of the invention, step (d) comprises applying the unidirectionally aligned external magnetic field to the substrate to unidirectionally permanently magnetize the permanently magnetizable material in a direction perpendicular to the major surface of the substrate, or step (d) comprises applying the unidirectionally aligned external magnetic field to the substrate to unidirectionally permanently magnetize the permanently magnetizable material in a direction parallel to the major surface of the substrate.

Another aspect of the present invention is a stamper/imprinter for use in forming a magnetic transition pattern in a magnetic material by means of contact printing, comprising:

(a) a non-magnetic substrate having a major surface comprising a patterned plurality of spaced-apart recesses with a plurality of non-recessed areas therebetween, the patterned plurality of recesses corresponding to the magnetic transition pattern to be formed in the magnetic material; and (b) unidirectionally permanently magnetized material filling each of the plurality of recesses and having exposed surfaces substantially coplanar with the plurality of non-recessed areas.

According to embodiments of the present invention, the non-magnetic substrate consists essentially of a non-magnetic material selected from the group consisting of: metals, metal alloys, semiconductors, ceramics, glass, glass-ceramics, polymers, and composites or laminates of the aforementioned materials; the patterned plurality of spaced-apart recesses corresponds to a servo pattern to be formed in the magnetic material; and the unidirectionally permanently magnetized material filling each of the recesses is selected from the group consisting of: FeOBa, FeOSr, SmCo, NdFeB, CoCr, CoCrB, and AlNiCo.

Embodiments of the present invention include stampers/imprinters wherein the unidirectionally permanently magnetized material filling each of the recesses is unidirectionally permanently magnetized in a direction perpendicular to the major surface of the substrate, and wherein the unidirectionally permanently magnetized material filling each of the recesses is unidirectionally permanently magnetized in a direction parallel to the major surface of the substrate.

Yet another aspect of the present invention is a method of forming a pre-selected magnetic transition pattern in a surface of a magnetic material, comprising the steps of:

(a) providing a workpiece including a surface comprised of the magnetic material, the magnetic material including a plurality of magnetic domains extending to the surface;

(b) unidirectionally aligning the magnetic domains of the magnetic material in a first direction;

(c) contacting the surface of the magnetic material with an imprinting surface of a stamper/imprinter to selectively re-align the magnetic domains and form the pre-selected magnetic transition pattern therein, the stamper/imprinter comprising:

(i) a non-magnetic substrate including an imprinting surface comprising a patterned plurality of spaced-apart recesses with a plurality of non-recessed areas therebetween, the patterned plurality of recesses corresponding to the magnetic transition pattern to be formed in the surface of the magnetic material; and (ii) unidirectionally permanently magnetized material filling each of the plurality of recesses and having exposed surfaces substantially coplanar with the plurality of non-recessed areas.

In accordance with preferred embodiments of the present invention, step (c) comprises contacting the surface of the magnetic material with an imprinting surface of a stamper/imprinter wherein the patterned plurality of spaced-apart recesses filled with unidirectionally permanently magnetized material forms a servo pattern for a magnetic recording medium.

According to a particular embodiment of the present invention:

step (a) comprises providing a longitudinal magnetic recording medium comprising a layer of the magnetic material including a plurality of magnetic domains extending parallel to the surface;

step (b) comprises unidirectionally aligning the magnetic domains of the magnetic material in a first direction parallel to the surface; and step (c) comprises contacting the surface of the magnetic material with an imprinting surface of a stamper/imprinter to selectively re-align the magnetic domains in a second, opposite direction parallel to the surface and form the pre-selected magnetic transition pattern therein, the stamper/imprinter comprising:

(i) a non-magnetic substrate including an imprinting surface comprising a patterned plurality of spaced-apart recesses with a plurality of non-recessed areas therebetween, the patterned plurality of recesses corresponding to the magnetic transition pattern to be formed in the surface of the magnetic material; and (ii) unidirectionally permanently magnetized material filling each of the plurality of recesses and aligned in the second, opposite direction parallel to the surface.

In accordance with another particular embodiment of the present invention:

step (a) comprises providing a perpendicular magnetic recording medium comprising a layer of the magnetic material including a plurality of magnetic domains extending perpendicular to the surface;

step (b) comprises unidirectionally aligning the magnetic domains of the magnetic material in a first direction perpendicular to the surface; and step (c) comprises contacting the surface of the magnetic material with an imprinting surface of a stamper/imprinter to selectively re-align the magnetic domains in a second, opposite direction perpendicular to the surface and form the pre-selected magnetic transition pattern therein, the stamper/imprinter comprising:

(i) a non-magnetic substrate including an imprinting surface comprising a patterned plurality of spaced-apart recesses with a plurality of non-recessed areas therebetween, the patterned plurality of recesses corresponding to the magnetic transition pattern to be formed in the surface of the magnetic material; and (ii) unidirectionally permanently magnetized material filling each of the plurality of recesses and aligned in the second, opposite direction perpendicular to the surface.

In accordance with embodiments of the present invention:

step (a) comprises providing a disk-shaped workpiece for a magnetic recording medium, the workpiece including a non-magnetic substrate with a layer of a magnetic recording material overlying a surface thereof, the substrate comprised of a non-magnetic material selected from the group consisting of Al, NiP-plated Al, Al—Mg alloys, other Al-based alloys, other non-magnetic metals, other non-magnetic metal-based alloys, glass, ceramics, polymers, glass-ceramics, and composites and/or laminates thereof; and step (c) comprises contacting the surface of said magnetic material with an imprinting surface of a stamper/imprinter comprising a non-magnetic substrate consisting essentially of a non-magnetic material selected from the group consisting of: metals, metal alloys, semiconductors, ceramics, glass, glass-ceramic composites, and polymers; and wherein said unidirectionally permanently magnetized material filling each of the recesses is selected from the group consisting of: FeOBa, FeOSr, SmCo, NdFeB, CoCr, CoCrB, and AlNiCo.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features, and in which like reference numerals are employed throughout to designate similar features, wherein.

DESCRIPTION OF THE INVENTION

The present invention addresses and solves problems and drawbacks attendant upon the use of stampers/imprinters with topographically patterned imprinting surfaces in performing high replication quality contact printing of recording layers of magnetic recording media for forming magnetic patterns therein, e.g., servo patterns, in a cost-efficient manner at high product throughput rates. Specifically, the present invention is based upon the discovery by the inventors that modification of the imprinting surface of the stamper/imprinter to eliminate the conventional topographical patterning thereof can provide a number of significant advantages, including, inter alia: (1) process simplification, as by eliminating the need for application of an external magnetic re-alignment field during the imprinting process; and (2) more rapid and more easily controllable processing of workpieces/substrates.

Key features of the present invention are the manufacture and use of improved stampers/imprinters with imprinting surfaces which are smooth and flat rather than topographically patterned, wherein the smooth, flat imprinting surfaces comprise a patterned plurality of unidirectionally magnetically aligned permanent magnets in-laid in the surface of a non-magnetic substrate and flush (co-planar) therewith. According to the invention, the plurality of in-laid, unidirectionally magnetically aligned permanent magnets are arranged in a pattern corresponding to a pre-selected magnetic transition pattern desired to be formed in the surface of a magnetic material upon contact therewith. A significant advantage afforded by the inventive stamper/imprinter vis-à-vis topographically patterned stampers/imprinters comprised of non-permanent magnets, is the ability to effect selective re-alignment of the magnetic domains of the magnetic material in contact with the unidirectionally magnetically aligned permanent magnets in-laid in the surface of the non-magnetic stamper body or substrate in the absence of an externally applied magnetic re-alignment field. A further advantage afforded by the present invention is the ability to manufacture the improved flat-surfaced stampers/imprinters by means of conventional micro-fabrication techniques, such as pattern formation in a resist layer, selective etching, resist removal, blanket layer deposition, and planarization.

Figure 6:
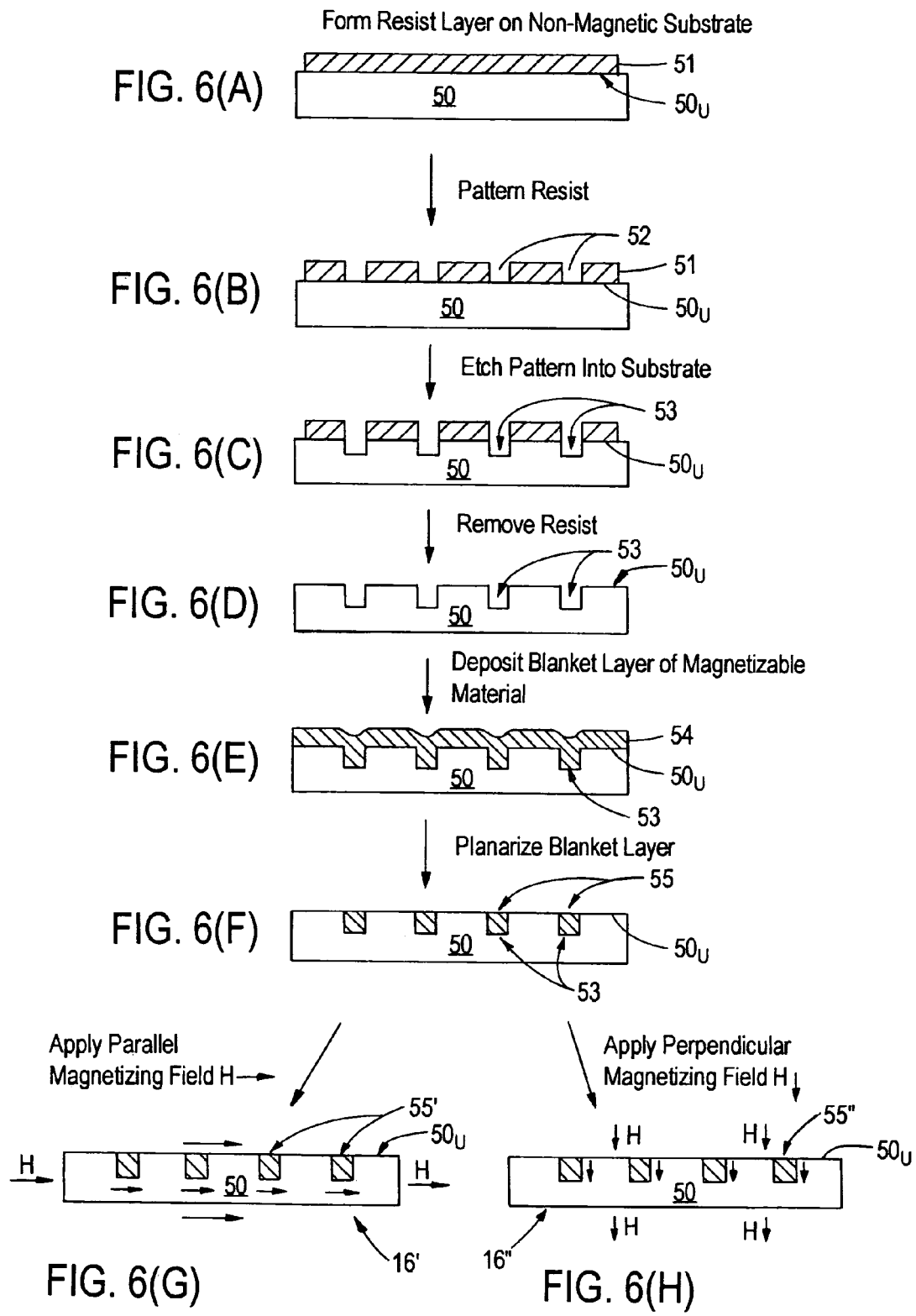
FIGS. 6 (A)–6 (H) illustrate, in schematic, simplified cross-sectional view, a sequence of process steps according to the invention for manufacturing flat-surfaced stampers/imprinters suitable for use in contact printing of magnetic transition patterns in longitudinal and perpendicular magnetic recording media.

Referring now to FIGS. 6 (A)–6 (H), illustrated therein, in schematic, simplified cross-sectional view, is a sequence of process steps according to an illustrative, but not limitative, embodiment of the invention for manufacturing flat-surfaced stampers/imprinters 16' and 16" comprising a patterned plurality of permanent magnets in-laid in the imprinting surfaces thereof, suitable for use in contact printing of magnetic transition patterns in longitudinal and perpendicular magnetic recording media, respectively.

Adverting to FIG. 6 (A), according to an initial step of the inventive stamper/imprinter manufacturing process, a suitably thick layer of a conventional positive or negative photoresist material 51 is formed on a flat planar surface of a non-magnetic substrate/body 50, illustratively upper surface $50_U$. According to the invention, a variety of mechanically hard and rigid materials are suitable for use as substrate/body 50, including non-magnetic materials selected from among metals, metal alloys, semiconductors (e.g., silicon, Si), ceramics, glass, glass-ceramics, polymers, and composites or laminates of these materials.

Figure 1:
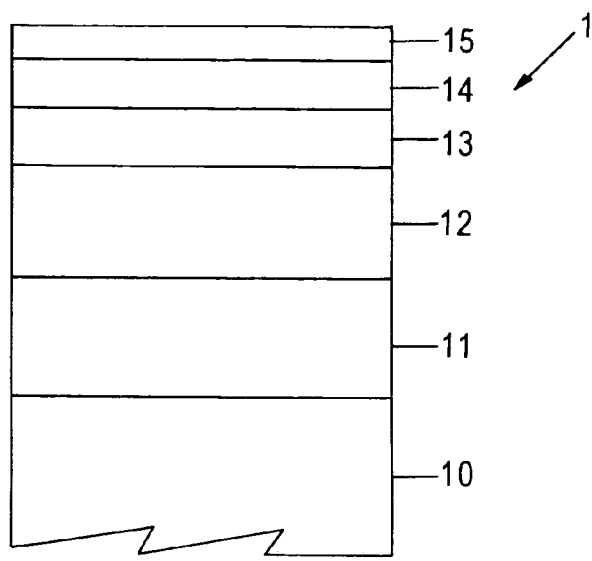
FIG. 1 illustrates, in schematic, simplified cross-sectional view, a portion of a longitudinal-type thin film magnetic recording medium.
Figure 2:
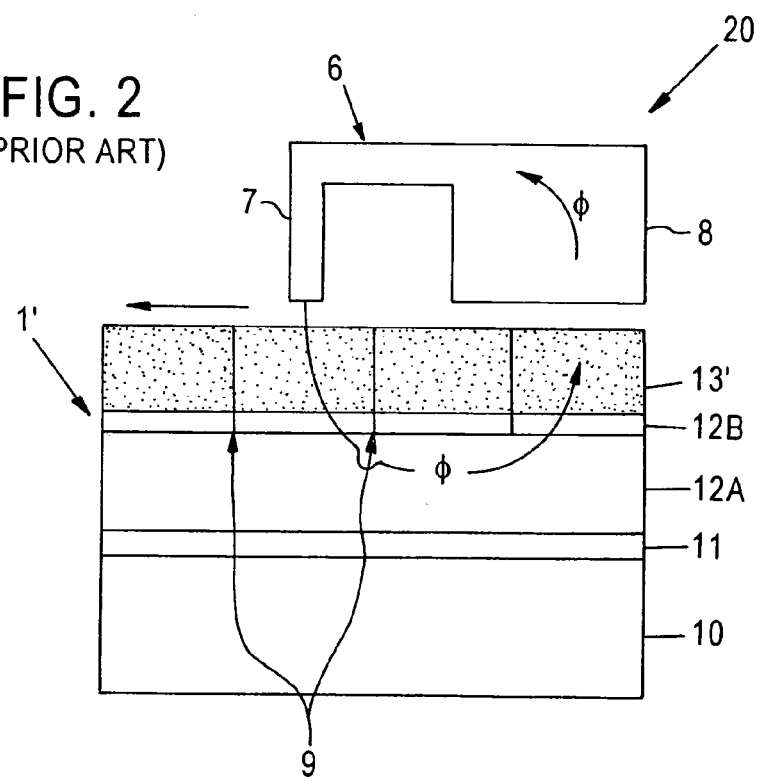
FIG. 2 illustrates, in schematic, simplified cross-sectional view, a portion of a magnetic recording, storage, and retrieval system comprised of a perpendicular-type magnetic recording medium and a single-pole transducer head.
Figure 3:
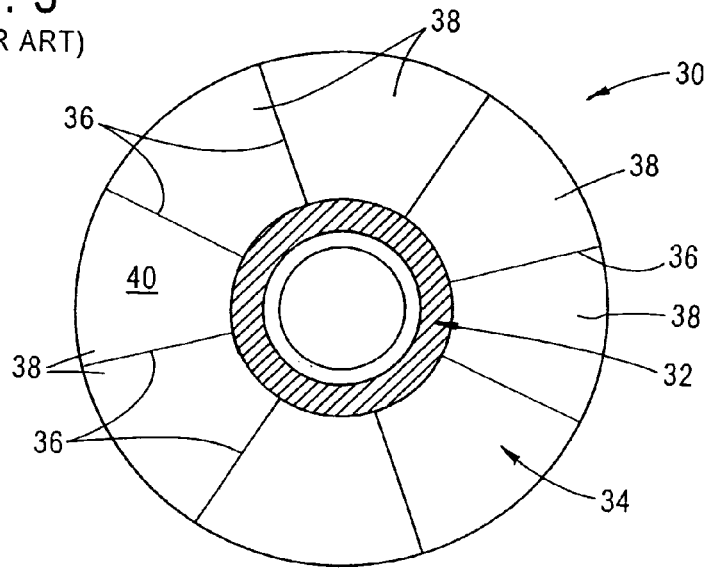
FIG. 3 is a simplified, schematic plan view, of a magnetic recording disk for illustrating the data, servo pattern, and CSS zones thereof.
Figure 4:
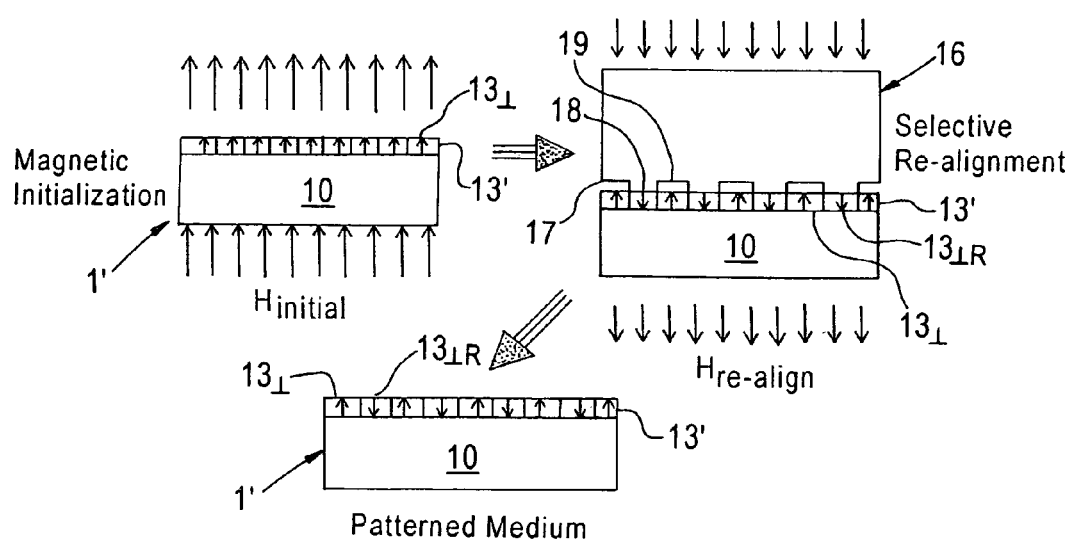
FIG. 4 illustrates, in schematic, simplified cross-sectional view, a sequence of process steps for contact printing a magnetic transition pattern in the surface of a perpendicular magnetic recording layer, utilizing a stamper/imprinter formed of a high saturation magnetization, high permeability magnetic material having an imprinting surface with a surface topography corresponding to the desired magnetic transition pattern.
Figure 5:
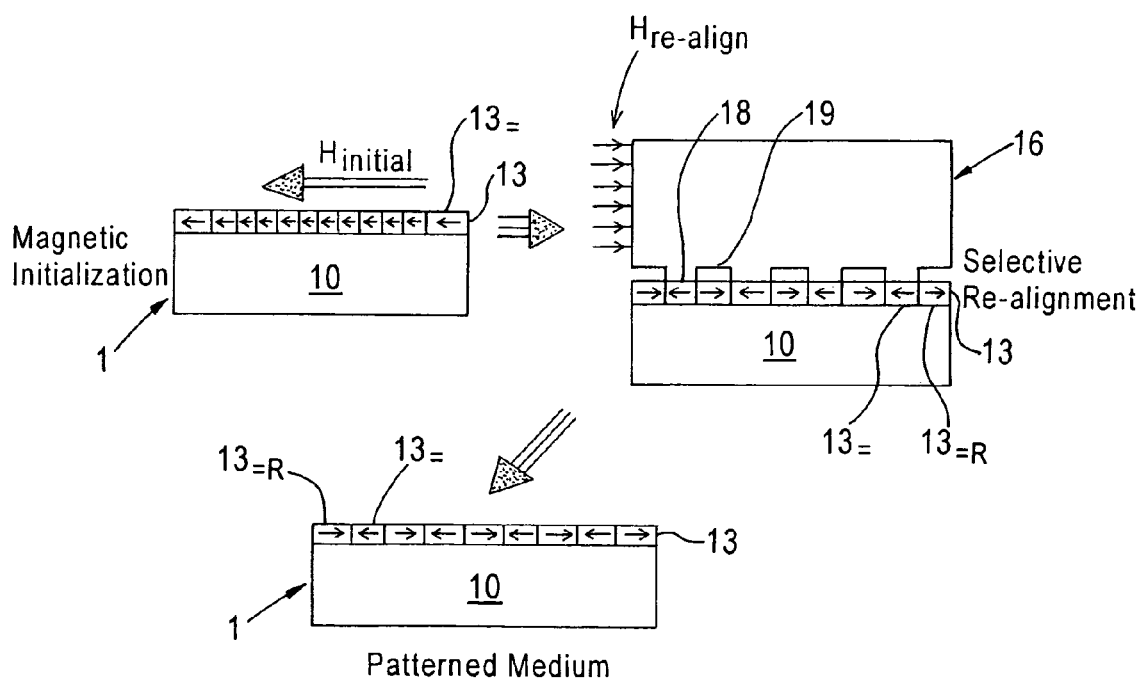
FIG. 5 illustrates, in schematic, simplified cross-sectional view, a similar sequence of process steps for contact printing a magnetic transition pattern in the surface of a longitudinal magnetic recording layer.

According to the next step of the inventive methodology, illustrated in FIG. 6 (B), a pattern of openings 52 extending to and exposing portions of upper surface $50_U$ of substrate/body 50 are formed in photoresist layer 51, as by conventional photolithographic processing techniques including steps of pattern exposure and development, wherein a pattern of openings 52 is formed in photoresist layer 51 corresponding to a magnetic transition pattern, e.g., a servo pattern, to be formed in the surface of a magnetic layer of a recording medium according to the inventive contact printing process (described below). The dimensions and spacings of openings 52 forming the pattern are generally similar to the dimensions and spacings, respectively, of the projections or depressions of the topographically patterned stampers 16 utilized in the servo pattern formation processes illustrated in FIGS. 4 and 5, i.e., the widths of the openings 52 typically are in the range from about 0.01 to about 1 µm and the inter-opening spacings are at least about 0.01 µm.

In the following step, shown in FIG. 6 (C), a pattern of recesses 53 corresponding to the pattern of openings 52 in the photoresist layer 51, is formed in the upper surface $50_U$ of substrate/body 50 to a preselected depth, as by a suitable selective etching process utilizing patterned photoresist layer 51 as an etch mask. Selection of a suitable selective etching technique for use in a given application will depend upon the particular combination of materials of the substrate/body 50 and the resist mask layer 51, and may, for example, be selected from among wet chemical and dry etching techniques, the latter including reactive plasma, ion beam, or sputter etching methodologies.

Referring to FIG. 6 (D), according to the next step of the inventive methodology, the patterned resist layer 51 is removed by any suitable technique, illustratively plasma ashing, resulting in formation of a substrate/body 50 for a stamper/imprinter having an upper surface $50_U$ including a patterned plurality of recesses 53 formed therein, corresponding to a magnetic transition pattern to be formed in the surface of a magnetic layer, e.g., a servo pattern.

According to the next step of the flat-surfaced contact stamper/imprinter fabrication process of the invention, shown in FIG. 6 (E), a blanket layer 54 of a permanently magnetizable material, e.g., selected from the group consisting of: FeOBa, FeOSr, SmCo, NdFeB, CoCr, CoCrB, and AlNiCo, is deposited on the upper surface $50_U$ of substrate/body 50 so as to completely fill each of the patterned plurality of recesses 53 and to include an excess thickness ("overburden") portion covering the non-recessed areas of the upper surface $50_U$. Formation of blanket layer 54 may be effected by any suitable process, including, but not limited to: electroplating; physical vapor deposition (PVD) such as vacuum evaporation, sputtering, ion plating, etc.; chemical vapor deposition (CVD); and combinations of the aforementioned techniques.

Referring to FIG. 6 (F), according to the next step of the inventive methodology, substrate/body 50 with blanket layer 54 of permanently magnetizable material formed on the recess-patterned upper surface $50_U$ thereof is subjected to a planarization process, typically a conventional chemical-mechanical planarization ("CMP") process (such as commonly utilized in semiconductor integrated circuit manufacture for forming damascene-type conductor patterns), to remove the overburden portions of blanket layer 54 overlying the non-recessed areas of the upper surface $50_U$ and render the exposed surfaces of the permanently magnetizable material filling recesses 53 co-planar with the non-recessed areas. Planarization results in formation of a stamper/imprinter substrate/body 50 having an upper surface 50$_U$ including a patterned plurality of in-laid regions 55 of permanently magnetizable material corresponding to a magnetic transition pattern to be formed in a layer of a magnetic material.

Adverting to FIGS. 6 (G) and 6 (H), in the ultimate step according to the inventive methodology, the thus-formed substrate/body 50 with in-laid regions 55 of permanently magnetizable material is subjected to a magnetic alignment (or "initialization") process comprising application of an external magnetic field of suitable direction and strength/intensity as to effect a preselected unidirectional permanent magnetization of each of the in-laid regions 55 to form magnetically aligned regions 55' characterized by a magnetic alignment direction parallel to surface 50$_U$ (FIG. 6 (G)) or regions 55" characterized by a direction of magnetic alignment perpendicular to surface 50$_U$ (FIG. 6 (H)).

Figure 7:
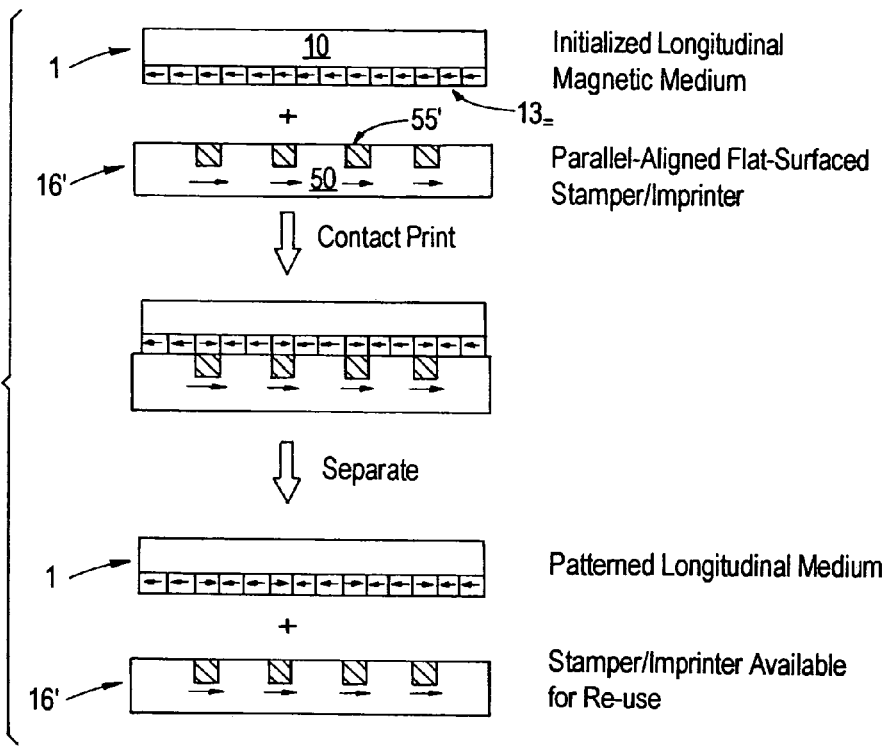
FIG. 7 illustrates, in schematic, simplified cross-sectional view, a process for contact printing of a magnetic transition pattern in a longitudinal magnetic recording medium utilizing a flat-surfaced stamper/imprinter manufactured according to the present invention.
Figure 8:
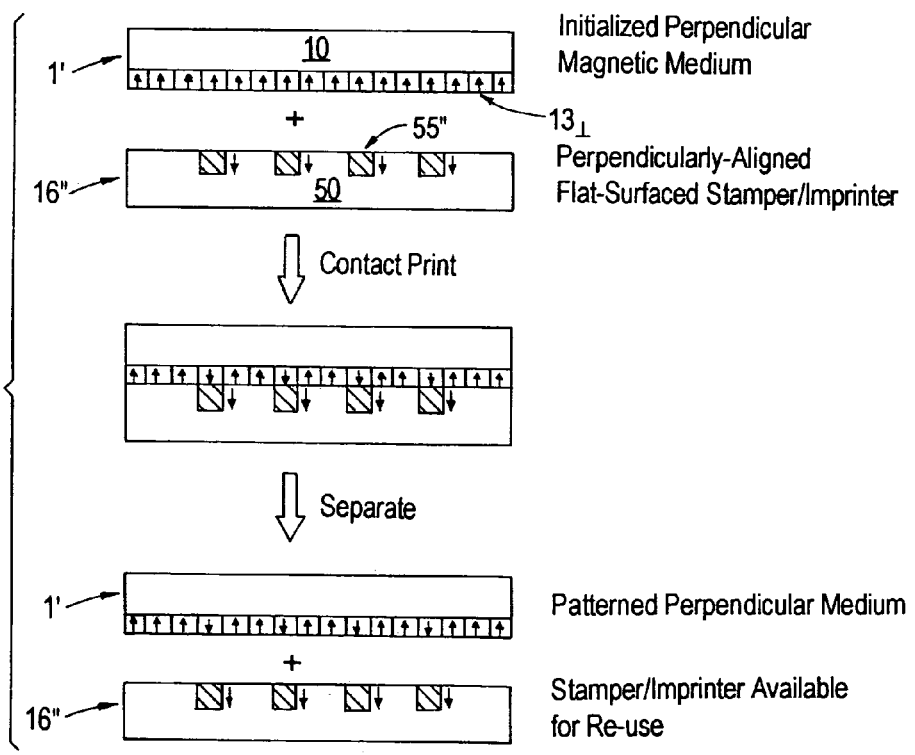
FIG. 8 illustrates, in schematic, simplified cross-sectional view, a process for contact printing of a magnetic transition pattern in a perpendicular magnetic recording medium utilizing a flat-surfaced stamper/imprinter manufactured according to the present invention.

FIG. 7 illustrates, in schematic, simplified cross-sectional view, a process for contact printing of a magnetic transition pattern in a longitudinal magnetic recording medium utilizing a flat-surfaced stamper/imprinter of the parallel aligned type illustrated in FIG. 6 (G), manufactured according to the present invention; and FIG. 8 illustrates, in schematic, simplified cross-sectional view, a process for contact printing of a magnetic transition pattern in a perpendicular magnetic recording medium utilizing a flat-surfaced stamper/imprinter of the perpendicularly aligned type illustrated in FIG. 6 (H), manufactured according to the present invention.

According to an initial step of either process (shown in the uppermost view of FIGS. 7–8), a unidirectionally magnetically aligned ("initialized") medium is provided, i.e., a unidirectionally magnetically aligned longitudinal magnetic recording medium 1 (as described above and illustrated in FIG. 5) or a unidirectionally magnetically aligned perpendicular magnetic recording medium 1' (as described above and illustrated in FIG. 4), along with a corresponding parallel-aligned, flat-surfaced stamper/imprinter 16' (as described above and illustrated in FIG. 6 (G)) or perpendicularly-aligned, flat-surfaced stamper/imprinter 16" (as described above and illustrated in FIG. 6 (H)). In either instance, the alignment direction of the parallel- or perpendicularly-aligned in-laid permanent magnets 55' or 55" is opposite the alignment direction of the corresponding parallel-aligned magnetic domains 13$_=$ of parallel-aligned medium 1 or perpendicularly-aligned magnetic domains 13$_\perp$ of medium 1'.

According to the next step of the inventive contact printing process (shown in the middle view of FIGS. 7–8), the unidirectionally magnetically aligned recording layer of longitudinal medium 1 or perpendicular medium 1' is placed in intimate contact with the in-laid, flat imprinting surface of a corresponding parallel-aligned stamper/imprinter 16 or perpendicularly-aligned stamper/imprinter 16', thereby effecting selective re-alignment of the parallel-aligned magnetic domains 13$_=$ of medium 1 in contact with the in-laid permanent magnets 55' of parallel-aligned stamper/imprinter 16' or the perpendicularly-aligned magnetic domains 13$_\perp$ of medium 1' in contact with the in-laid permanent magnets 55' of perpendicularly-aligned stamper/imprinter 16". A necessary condition for effecting selective re-alignment of the parallel aligned magnetic domains 13$_=$ of medium 1 and perpendicularly-aligned magnetic domains 13$_\perp$ of medium 1' is that the coercivity of the permanently magnetizable material of the in-laid regions 55' and 55" of the respective stampers/imprinters 16' and 16" exceed the coercivity of the magnetic material of the respective magnetic materials of the longitudinal and perpendicular recording layers. More specifically, the choice of the permanently magnetizable material for in-laid regions 55' and 55" is dependent upon the coercivity of the magnetic medium to be patterned by contact printing. A range of coercivities for the permanently magnetizable material can be obtained by adjustment of its composition. For example, the coercivity of AlNiCo may be varied from about 0.4 to about 1.5 kOe, FERRITE 1 from about 1 to about 5 kOe, and NdFeB from about 7 to about 13 kOe.

In the final step of the inventive methodology, patterned (e.g., servo-patterned) longitudinal or perpendicular magnetic recording media 1 or 1' comprising selectively re-aligned magnetic domains 13$_{=R}$ or —$_{\perp R}$, arranged in a desired pattern replicating the pattern of in-laid permanent magnets in the imprinting surfaces of stampers/imprinters, are obtained upon separation of the magnetic media from the corresponding parallel- or perpendicularly-aligned stamper/imprinter 16' or 16' (as shown in the lowermost view of FIGS. 7–8) Stampers/imprinters 16' or 16' are then each available for re-use with another initialized longitudinal or perpendicular recording medium 1 or 1'.

The present invention thus affords a number of significant advantages over previous contact printing processes for forming magnetic transition patterns in magnetic recording layers, including: process simplification arising from elimination of the requirement for application of an external magnetic re-alignment field during the imprinting process, and more rapid and more readily controllable processing of workpieces/substrates.

It should be apparent to one of ordinary skill in the art that the present invention provides a significant improvement over the conventional art such as has been described above, particularly with respect to the ease and simplicity of contact printing of magnetic transition patterns afforded by the invention. Further, the imprinting surface of the stampers/imprinters according to the invention can be formed with a wide variety of magnetic transition patterns, whereby the inventive methodology and apparatus can be rapidly, easily, and cost-effectively implemented in the automated manufacture of a number of articles, devices, etc., requiring magnetic transition patterning, of which servo patterning of longitudinal and perpendicular magnetic recording media merely constitute examples of the versatility and utility of the invention.

In the previous description, numerous specific details are set forth, such as specific materials, structures, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in other combinations and environments and is susceptible of changes and/or modifications within the scope of the inventive concept as expressed herein.

What is claimed is:

1. A method of forming a magnetic transition pattern in a surface of a magnetic material, comprising the steps of:
   (a) providing a perpendicular magnetic recording medium including a surface comprising a layer of magnetic material including a plurality of magnetic domains extending perpendicular to said surface;
(b) unidirectionally aligning said magnetic domains of said magnetic material in a first direction perpendicular to said surface; and
(c) contacting said surface of said magnetic material with an imprinting surface of a stamper/imprinter to selectively re-align said magnetic domains in a second, opposite direction perpendicular to said surface and form said magnetic transition pattern therein, said stamper/imprinter comprising:
  (i) a non-magnetic substrate including an imprinting surface comprising a patterned plurality of spaced-apart recesses with a plurality of non-recessed areas therebetween, said patterned plurality of recesses corresponding to said magnetic transition pattern to be formed in said surface of said magnetic material; and
  (ii) unidirectionally permanently magnetized material filling each of said plurality of recesses, aligned in said second, opposite direction perpendicular to said surface, and having exposed surfaces substantially coplanar with said plurality of non-recessed areas.

2. The method according to claim 1, wherein:
step (c) comprises contacting said surface of said magnetic material with an imprinting surface of a stamper/imprinter wherein said patterned plurality of spaced-apart recesses filled with unidirectionally permanently magnetized material forms a servo pattern for a magnetic recording medium.

3. The method according to claim 1, wherein:
step (a) comprises providing a disk-shaped workpiece for a magnetic recording medium, said workpiece including a non-magnetic substrate with a layer of a magnetic recording material overlying a surface thereof, said substrate comprised of a non-magnetic material selected from the group consisting of Al, NiP-plated Al, Al—Mg alloys, other Al-based alloys, other non-magnetic metals, other non-magnetic metal-based alloys, glass, ceramics, polymers, glass-ceramics, and composites and/or laminates thereof; and
step (c) comprises contacting said surface of said magnetic material with an imprinting surface of a stamper/imprinter comprising a non-magnetic substrate consisting essentially of a non-magnetic material selected from the group consisting of: metals, metal alloys, semiconductors, ceramics, glass, glass-ceramic composites, and polymers; and wherein said unidirectionally permanently magnetized material filling each of said recesses is selected from the group consisting of: FeOBa, FeOSr, SmCo, NdFeB, CoCr, CoCrB, and AlNiCo.

* * * * *